US011668577B1

(12) United States Patent
Nussbaum et al.

(10) Patent No.: US 11,668,577 B1
(45) Date of Patent: Jun. 6, 2023

(54) METHODS AND SYSTEMS FOR RESPONSE VEHICLE DEPLOYMENT

(71) Applicant: State Farm Mutual Automobile Insurance Company, Bloomington, IL (US)

(72) Inventors: Bryan R. Nussbaum, Bloomington, IL (US); Rebecca A. Little, Mesa, AZ (US); Kevin L. Mitchell, Tempe, AZ (US); Nathan C. Summers, Mesa, AZ (US); An Ho, Phoenix, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 303 days.

(21) Appl. No.: 16/915,557

(22) Filed: Jun. 29, 2020

Related U.S. Application Data

(63) Continuation of application No. 15/946,920, filed on Apr. 6, 2018, now Pat. No. 10,732,001.

(51) Int. Cl.
| | |
|---|---|
| *G06T 19/00* | (2011.01) |
| *G06T 17/05* | (2011.01) |
| *G01C 21/34* | (2006.01) |
| *G01C 21/36* | (2006.01) |
| *G08G 1/00* | (2006.01) |
| *G06N 20/00* | (2019.01) |

(52) U.S. Cl.
CPC ..... *G01C 21/3461* (2013.01); *G01C 21/3638* (2013.01); *G06N 20/00* (2019.01); *G06T 17/05* (2013.01); *G08G 1/202* (2013.01)

(58) Field of Classification Search
CPC ............ G01C 21/3461; G01C 21/3638; G06N 20/00; G06T 17/05; G08G 1/202
See application file for complete search history.

(56) References Cited

U.S. PATENT DOCUMENTS

| | | | |
|---|---|---|---|
| 7,395,151 B2 | 7/2008 | O'Neill et al. | |
| 8,453,219 B2 | 5/2013 | Shuster et al. | |
| 8,756,085 B1 | 6/2014 | Plummer et al. | |
| 9,311,271 B2 | 4/2016 | Wright | |
| 9,354,045 B1 | 5/2016 | Best | |
| 9,563,201 B1 | 2/2017 | Tofte et al. | |
| 9,633,487 B2 | 4/2017 | Wright | |
| 9,721,304 B1 | 8/2017 | Parchment et al. | |
| 10,127,722 B2 | 11/2018 | Shakib et al. | |
| 10,192,369 B2 | 1/2019 | Wright | |
| 10,198,879 B2 | 2/2019 | Wright | |

(Continued)

*Primary Examiner* — Peter D Nolan
*Assistant Examiner* — Demetra R Smith-Stewart
(74) *Attorney, Agent, or Firm* — Lee & Hayes, P.C.

(57) ABSTRACT

Computer implemented methods and systems for deploying response vehicles based on a virtual environment. A server may obtain a virtual model of an overall region wherein the virtual model was generated based upon a plurality of images captured by a remote imaging vehicle. The server may then provide the virtual model to a user electronic device for rendering in a virtual environment. The server may then determine a target location within the overall region at which the response vehicle should be deployed and generate a route for the response vehicle to follow. The route may be based on damage indicated by the virtual model of the overall region. The server may then provide the route to the user electronic device and/or the response vehicle.

20 Claims, 13 Drawing Sheets

(56) References Cited

U.S. PATENT DOCUMENTS

| | | |
|---|---|---|
| 10,217,168 B2 | 2/2019 | Tofte et al. |
| 10,380,694 B1 * | 8/2019 | Grant .................... G08G 5/045 |
| 10,459,706 B1 | 10/2019 | Little et al. |
| 10,521,962 B1 | 12/2019 | Nussbaum et al. |
| 2004/0193441 A1 | 9/2004 | Altieri |
| 2009/0138290 A1 | 5/2009 | Holden |
| 2009/0225001 A1 | 9/2009 | Biocca et al. |
| 2009/0241046 A1 * | 9/2009 | Nielsen .................... G01V 8/10 715/764 |
| 2011/0218825 A1 | 9/2011 | Hertenstein |
| 2012/0019522 A1 | 1/2012 | Lawrence et al. |
| 2012/0076437 A1 | 3/2012 | King |
| 2012/0096384 A1 | 4/2012 | Albert et al. |
| 2012/0155719 A1 | 6/2012 | Yun et al. |
| 2014/0119648 A1 | 5/2014 | Park et al. |
| 2015/0268058 A1 | 9/2015 | Samarasekera et al. |
| 2016/0061622 A1 | 3/2016 | Ren et al. |
| 2016/0313736 A1 | 10/2016 | Schultz et al. |
| 2017/0089710 A1 | 3/2017 | Slusar |
| 2017/0090460 A1 | 3/2017 | Andrew et al. |
| 2017/0148102 A1 | 5/2017 | Franke et al. |
| 2017/0192631 A1 | 7/2017 | Lee et al. |
| 2017/0251143 A1 | 8/2017 | Peruch et al. |
| 2017/0278409 A1 | 9/2017 | Johnson et al. |
| 2017/0337824 A1 * | 11/2017 | Chen .................... G08G 5/0086 |
| 2017/0359712 A1 | 12/2017 | Meredith et al. |
| 2018/0003516 A1 | 1/2018 | Khasis |
| 2018/0004498 A1 | 1/2018 | Meyer |
| 2018/0040039 A1 | 2/2018 | Wells et al. |
| 2018/0165616 A1 | 6/2018 | Sun et al. |
| 2019/0014319 A1 | 1/2019 | Jannard et al. |
| 2019/0095877 A1 | 3/2019 | Li |
| 2019/0095963 A1 | 3/2019 | Martin |
| 2019/0102752 A1 | 4/2019 | Valenti et al. |
| 2020/0041071 A1 * | 2/2020 | Werlen .................... F17C 5/06 |
| 2020/0184706 A1 * | 6/2020 | Speasl .................... H04L 9/0643 |

* cited by examiner

METHODS AND SYSTEMS FOR RESPONSE VEHICLE DEPLOYMENT

CROSS-REFERENCE TO RELATED APPLICATIONS

This application is a continuation of and claims priority to U.S. Non-Provisional patent application Ser. No. 15/946,920, filed on Apr. 6, 2018, and entitled "Methods and Systems for Response Vehicle Deployment," which is incorporated by reference herein in its entirety for all purposes.

FIELD OF THE DISCLOSURE

The present disclosure relates to deploying response vehicles, and, in particular, to virtualization techniques that deploy response vehicles in regions impacted by damage-causing events.

BACKGROUND

Virtual visualization enables one to view an overall physical region without having to actually visit the physical region. Virtual visualization is particularly useful in situations in which physically visiting the physical region is difficult, expensive, dangerous, or impossible. For example when a disaster (e.g., a hurricane, a flood, a wildfire, a tornado, etc.) strikes, it is often unsafe to visit the impacted area. Accordingly, it is useful to virtually view the physical region by generating one or more virtual models of the physical region and the various features therein. Thus, users can evaluate the impacted area without being exposed to the dangers caused by the disaster.

However, traditionally it is difficult to deploy response vehicles in areas impacted by damage-causing events, such as disasters. For example, the damage-causing event may block or otherwise cause roadways to become untraversable. Traditional mapping techniques utilize data captured prior to the occurrence of the damage-causing event. Accordingly, traditional mapping techniques may be unreliable in regions impacted by damage-causing events. Thus, there is a need to be able to deploy response vehicles in a manner that accounts for damage to damaged areas.

SUMMARY

In one aspect, a computer-implemented method is provided. The method may include (1) obtaining, by one or more processors, a virtual model of an overall region, the virtual model being generated based upon a plurality of images captured by a remote imaging vehicle after a damage-causing event impacted the overall region; (2) providing, by one or more processors, the virtual model for rendering by a user electronic device in a virtual environment that includes virtual representations of a response vehicle; (3) determining, by one or more processors, a target location within the overall region at which a response vehicle should be deployed to perform a task; (4) generating, by one or more processors, a route from a current location of a response vehicle to the target location, wherein the route is based upon damage to the overall region; and (5) providing, by one or more processors, the route to at least one of the response vehicle or the user electronic device.

In another aspect, a system is provided. The system may include (i) one or more processors; (ii) one or more transceivers operatively connected to the one or more processors and configured to send and receive communications over one or more communication networks; and (iii) one or more non-transitory memories coupled to the one or more processors and storing computer-executable instructions. The instructions, when executed by the one or more processors, cause the system to (1) obtain a virtual model of an overall region, the virtual model being generated based upon a plurality of images captured by a remote imaging vehicle after a damage-causing event impacted the overall region; (2) provide the virtual model for rendering by a user electronic device in a virtual environment that includes virtual representations of a response vehicle; (3) determine a target location within the overall region at which a response vehicle should be deployed to perform a task; (4) generate a route from a current location of a response vehicle to the target location, wherein the route is based upon damage to the overall region; and (5) provide the route to at least one of the response vehicle or the user electronic device.

In yet another aspect, a non-transitory computer-readable medium storing computer-executable instructions is provided. The instructions, when executed by one or more processors, cause one or more processors to (1) obtain a virtual model of an overall region, the virtual model being generated based upon a plurality of images captured by a remote imaging vehicle after a damage-causing event impacted the overall region; (2) provide the virtual model for rendering by a user electronic device in a virtual environment that includes virtual representations of a response vehicle; (3) determine a target location within the overall region at which a response vehicle should be deployed to perform a task; (4) generate a route from a current location of the response vehicle to the target location, wherein the route is based upon damage to the overall region; and (5) provide the route to at least one of the response vehicle or the user electronic device.

DETAILED DESCRIPTION

Figure 1:
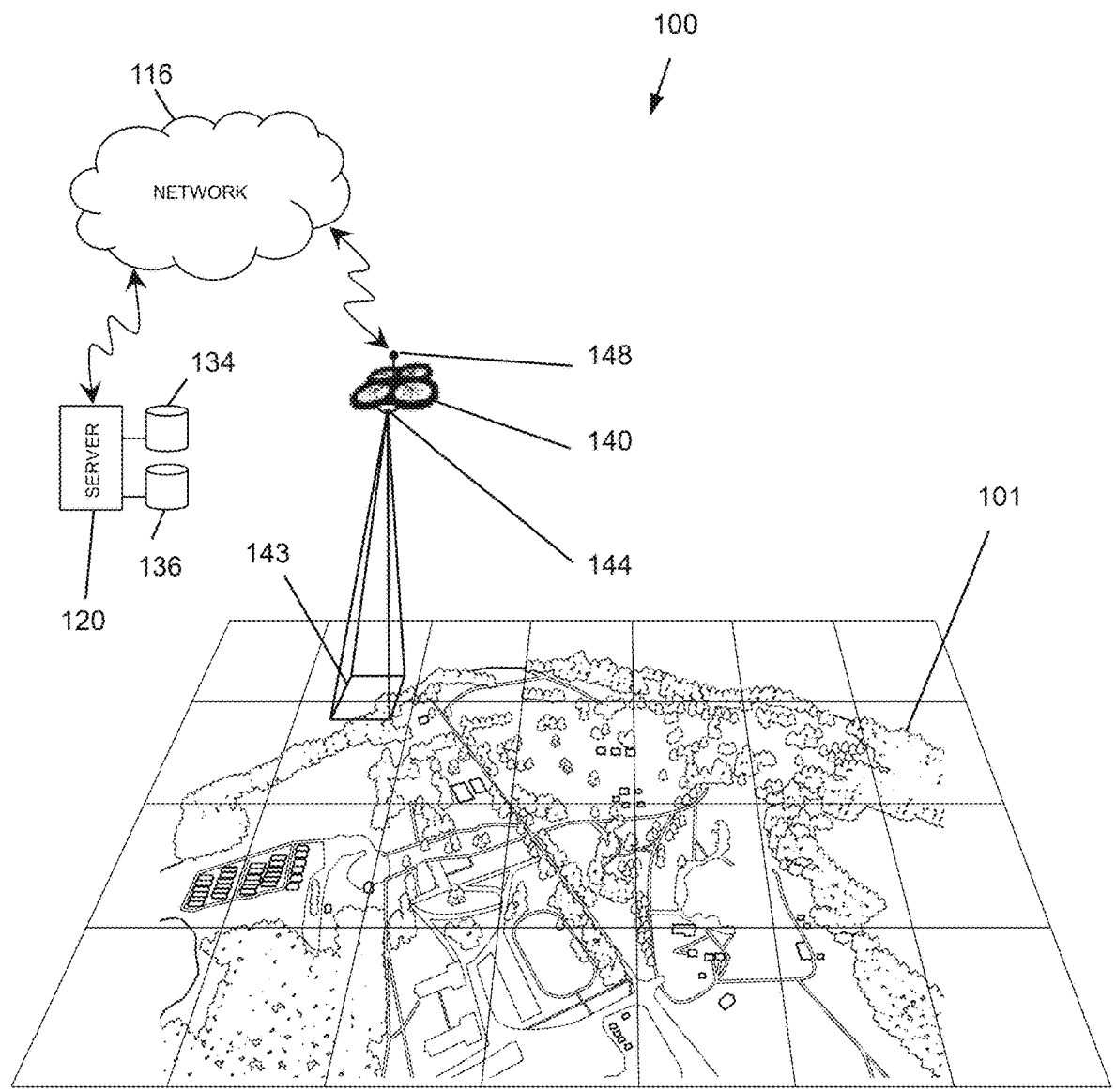
FIG. 1 depicts an example environment for capturing a set of image data representative of an overall region.

Methods, systems, and virtualization software applications and associated graphical user interfaces (GUIs) for virtual visualization of overall physical regions are described herein. To this end, the visualization may include a virtual environment in which a virtual model of an overall region is rendered. According to aspects, features, such as structures, vegetation, vehicles, river banks, roadways, or other objects that may be damaged by disasters, within the overall region are also modeled and rendered within the virtual environment. The virtual environment may be viewed by a user for the purpose of emergency response, damage assessment and/or filing of insurance claims.

To generate a virtual model of an overall region, a server may dispatch an imaging vehicle to capture a set of image data indicative of the overall region. The imaging vehicle may be, for example, an aerial imaging drone, an imaging crawler robot, an aquatic imaging drone, or any other imaging vehicle. The imaging vehicle may be controlled autonomously, semi-autonomously, or manually by either a remote or an on-site controller or pilot. The imaging vehicle may traverse the overall region to capture a set of image data representative of the overall region. The imaging vehicle may transmit the captured set of image data to the server for storage.

In some implementations, a user and/or the server may determine one or more image capture characteristics for the set of image data, such as an image resolution, an image capture rate, an image angle, an altitude from which image data is captured, and/or a travel path of the imaging vehicle. In manual implementations, the user may select from a menu of previously determined routines and functions to set the image capture characteristics.

A server obtains the captured set of image data to generate a virtual model of the overall region using virtual modeling techniques described below. The server may then store the generated virtual models in a model database. In some embodiments, the model database may store multiple versions of a particular virtual model. For example, one version of the virtual model may be based on image data captured prior to damage occurring and a second version of the virtual model may be based on image data captured after damage has occurred. Accordingly, the server may associate each virtual model with a timestamp to enable the rendering of a virtual environment that depicts the overall region at various points in time.

A user may interact with a user electronic device to initiate a rendering of the virtual environment. The user electronic device may be a computer, a smart phone, a tablet, smart glasses or goggles, a smart watch, a personal virtual reality device, a visualization base station, or any other electronic device. In some embodiments, the user electronic device is interconnected with a separate display device to enable the user to view the virtual environment in a virtual or mixed reality environment. According to aspects, the display device may be a flat panel screen, virtual reality display device, or a mixed-reality display device communicatively coupled to the user electronic device. In other embodiments, the display device may be the user electronic device (such as when the display device is a virtual or mixed reality headset capable of communicating directly with the server).

In response, the server may provide a virtual environment that includes the virtual model of the overall region. It should be appreciated that the when the user views the virtual environment via the display device, portions of the virtual environment may not be visible. To this end, the portion of virtual environment visible to the user may be defined by a virtual camera object. The user may interact with the display device to move or otherwise interact with the virtual camera object. For example, the user may move, zoom, rotate, or otherwise adjust the virtual camera object. The portion of the virtual environment viewable from the virtual camera object is referred to as the viewing angle.

In some embodiments, the user electronic device analyzes a viewing angle to determine how the virtual environment should be depicted by the display device. In these embodiments, rendering involves the user electronic device analyzing the virtual models to determine how the display device should depict the virtual environment based on the viewing angle. In embodiments that communications that have sufficiently low latency, such as 5G technologies and beyond, the user electronic device may transmit indications to the server of any change to the viewing angle and the server may respond with visual representations of how the virtual environment should be depicted. Accordingly, in these embodiments, "providing" the virtual environment to a user electronic device for rendering may include the server's response indicating how the virtual environment should be depicted.

In one aspect, the user may interact with the virtual environment to coordinate a response to damage that occurred to the overall region. One example response includes assessing the extent of the damage to the overall region or to structures therein. As another example, the response may include deploying emergency response vehicles to an appropriate location within the overall region. As yet another example, the response may include tracking the recovery efforts with regards to particular features. In this manner the user may coordinate a response to an emergency without physically visiting the hazardous locations within the modeled regions.

In some embodiments, the server may generate an overlay on the virtual environment to depict information associated with particular regions and/or features. The server may then update the virtual environment to include one or more overlays. Accordingly, when the user electronic device renders the virtual environment, the virtual environment may include these overlays. In some embodiments, the overlays may also include interactive interface elements. For example, an overlay may include an interface element that enables the user to request the capture of additional image data of a particular feature or region (an "indicated area within an overall region"). As another example, an overlay may include an interface element that enables the user to view a virtual environment that includes a high resolution model of the particular structure or region.

Further, in some embodiments, the data included in the overlays may change over time. For example, an overlay may be indicative of a task or claim status. Accordingly, as a database that tracks the task of claim status is updated, the server may automatically update any overlays included in the rendered virtual environment. As another example, an overlay may be indicative of a location of a response vehicle. In this example, the response vehicle may report location information (e.g., GPS data) to the server. Accordingly, as the response vehicle traverses the overall physical region, the server may update the location of the response vehicle overlay within the virtual environment.

FIG. 1 depicts an example environment 100 for capturing a set of image data representative of an overall region 101. As illustrated, that environment 100 includes an imaging vehicle 140 configured to capture the set of image data. The overall region 101 may include a plurality of features, including structures. Although FIG. 1 only depicts a single imaging vehicle 140, in other embodiments multiple imaging vehicles 140 may be used to capture the set of image data. Further, while FIG. 1 depicts the imaging vehicle 140 as an aerial drone, additionally or alternatively, the imaging vehicle(s) 140 may include a non-aerial drone or vehicle, such as a crawler or an aquatic drone. Further, although the image data is generally described herein as being visual-spectrum image data, the image data may include thermal imaging data and/or image data indicative of radiation levels.

According to certain aspects, the imaging vehicle 140 may be manually or autonomously piloted to capture a set of image data while traversing the overall region 101. The imaging vehicle 140 may include an imaging apparatus 144 configured to capture image data indicative of a field of imaging 143. As the imaging vehicle 140 traverses the overall region 101, the field of imaging 143 also moves. Accordingly, the imaging vehicle 140 may capture imaging data indicative of the different portions of the overall region 101. It should be appreciated that in some embodiments, the field of imaging 143 is not at a fixed angle below the imaging vehicle 140, but may pan, tilt, and/or zoom to capture image data indicative of the overall region 101 at different angles. In some implementations, the imaging vehicle 140 captures image data such that there is an overlap between successive sets of captured image data. These overlaps provide additional image data about the same location of the overall region 101, which enables more accurate determination of the dimensions of features (e.g., structures, trees, roads, water, and so on) of the overall region. It should be appreciated that if the imaging vehicle 140 captures the set of image data at a high-altitude and/or without focusing on a particular portion of the overall region 101, the set of image data may lack sufficient detail to support some of the aforementioned emergency response tasks.

The imaging vehicle 140 may also include a communication apparatus 148 for transmitting, via a wireless communication network 116, the captured set of image data to a server 120. The communication network 116 may support communications via any standard or technology (e.g., GSM, CDMA, TDMA, WCDMA, LTE, EDGE, OFDM, GPRS, EV-DO, UWB, IEEE 802 including Ethernet, WiMAX, and/or others). The server 120 may store the transmitted image data at an image database 134.

According to aspects, the server 120 may analyze the image data stored at the image database 134 to generate virtual models of the overall region 101. To generate a virtual model, the server 120 may analyze the image data to determine dimensions for the various features of the overall region 101 and/or to adapt the image data to appear on the appropriate dimension of each feature. In some implementations, the server 120 generates a virtual model for a plurality of the features of the overall region 101. Accordingly, the virtual model for the overall region 101 may include several virtual models of the various features of the overall region 101. The server 120 may then store the generated virtual models at a model database 136.

Figure 2:
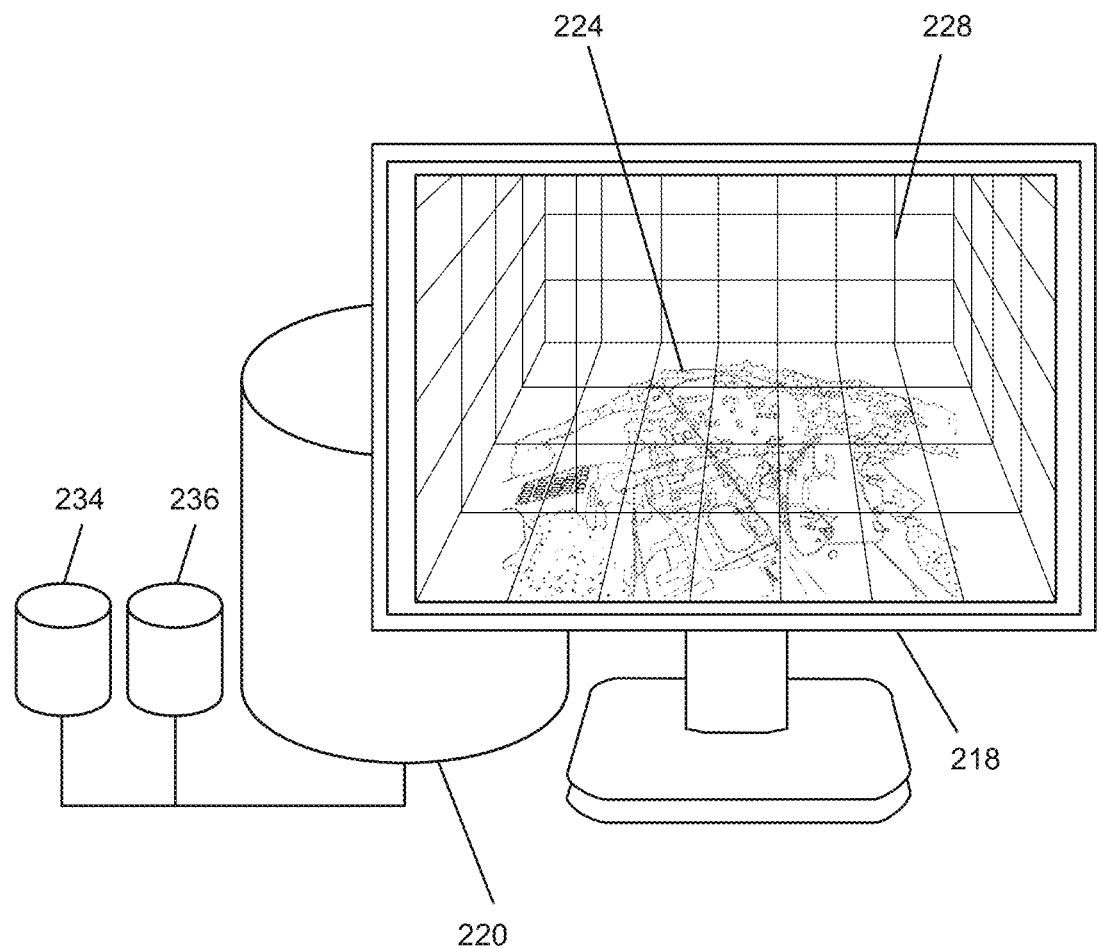
FIG. 2 depicts a rendering of a virtual environment that includes a virtual model of an overall region.

FIG. 2 depicts a rendering 224 of a virtual environment 228 that includes a virtual model of an overall region. In the illustrated embodiment, the rendering 224 is displayed on a display screen 218. To generate the rendering 224, a server 220 (such as the server 120 of FIG. 1) accesses a model database 236 (such as the model database 136 of FIG. 1) to obtain virtual models of the overall region and/or the features thereof. The server 220 may also be communicatively coupled to an image database 234 (such as the image database 136 of FIG. 1). The server 220 may then generate the virtual environment 228 in which the virtual model of the overall region is rendered. As described herein, the virtual environment 228 includes a viewing angle. Accordingly, a user electronic device (not depicted) communicative coupled to the server 220 may compare the viewing angle with the location of the virtual model of the overall region to generate the rendering 224. A user may then interact with the virtual environment 228 to view the renderings 224 from different angles and/or zoom levels.

Figure 3:
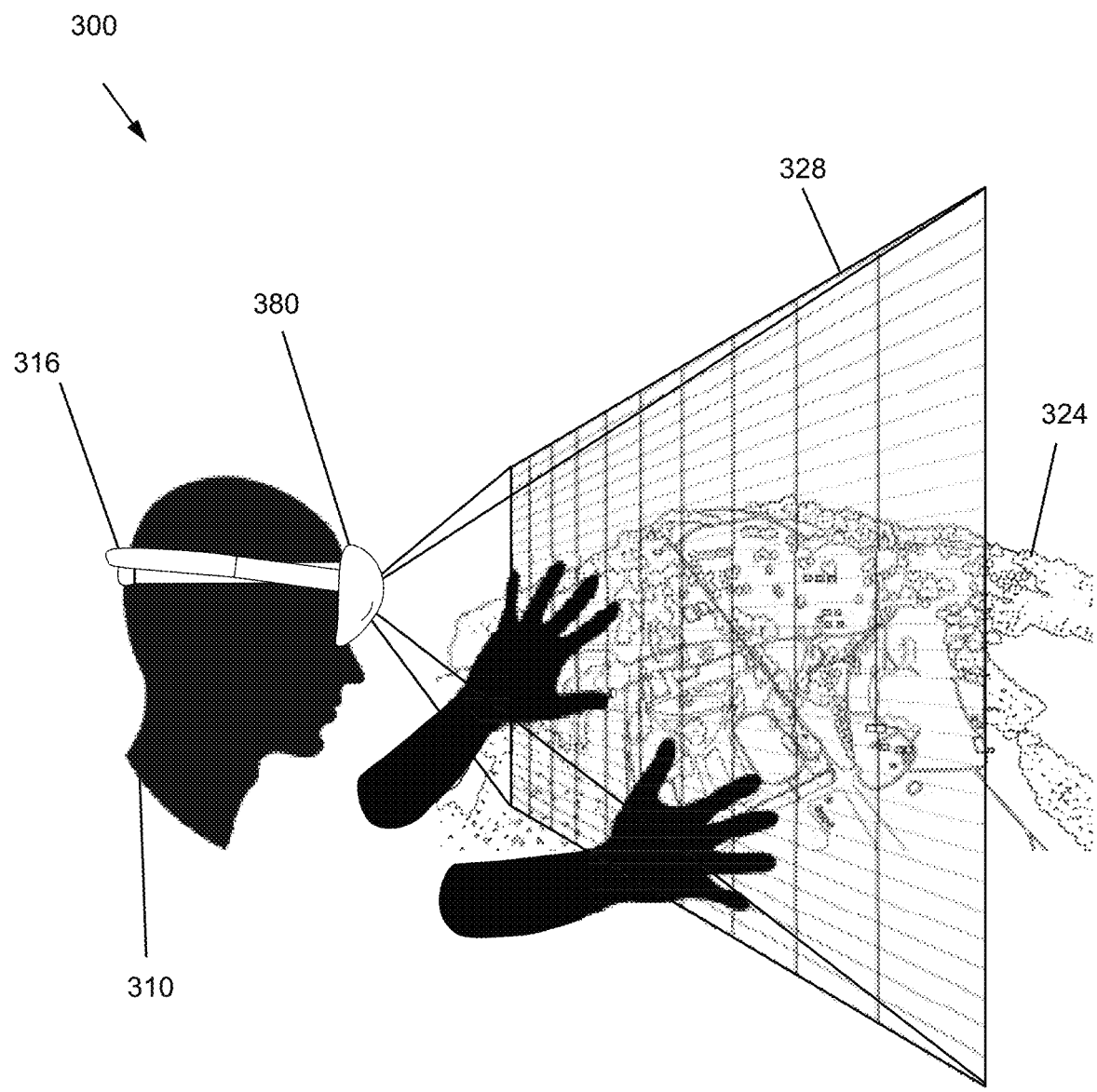
FIG. 3 depicts an example system wherein an exemplary user electronic device is configured to present renderings of a virtual model to a user in a virtual reality environment.

FIG. 3 depicts an example system 300 wherein an exemplary user electronic device 380 is configured to present renderings 324 of the virtual model to a user 310 in a virtual reality environment 328. The user electronic device 380 may be a virtual imaging device configured to be placed in front of the user's eyes, like a pair of goggles or spectacles, and secured by a head gear mechanism 316. As the user 310 views the renderings 324 of the overall region within the virtual environment 328, the user 310 may use hand gestures to manipulate the virtual environment 328. For example, the user 310 may manipulate the virtual environment 328 in order to change the perspective, angle, size, zoom factor, resolution, or other aspects of how the virtual environment 328 is displayed. Additionally or alternatively, the user 310 may use a control device (not depicted) to manipulate the virtual environment 328. Of course, the user 310 may manipulate the virtual reality environment 328 using any known technique.

Figure 4:
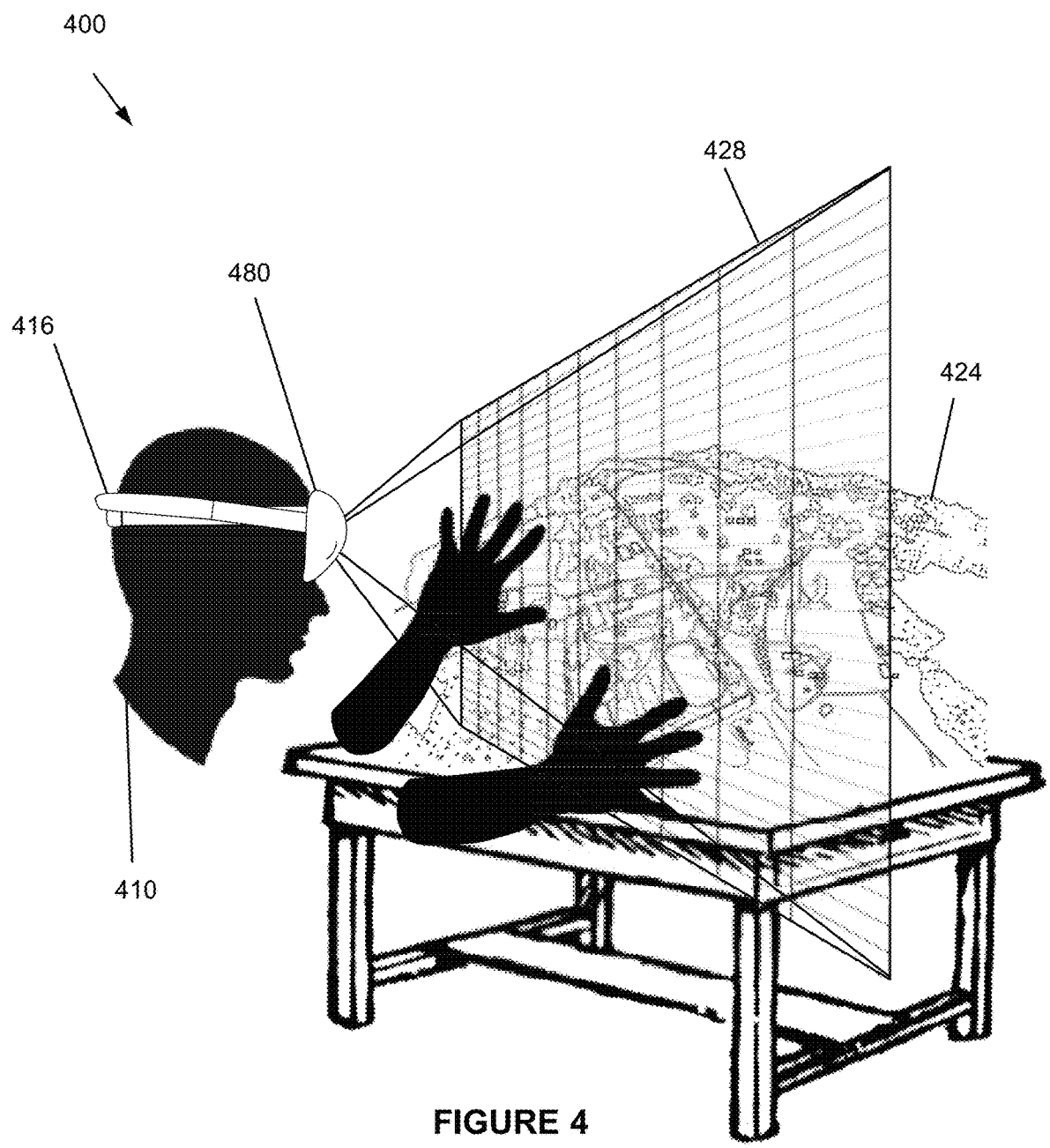
FIG. 4 depicts an example system wherein an exemplary user electronic device is configured to present a rendering of a virtual model to a user in a mixed reality environment.

FIG. 4 depicts an example system 400 wherein an exemplary user electronic device 480 is configured to present a rendering 424 of the virtual model to a user 410 in a mixed reality virtual environment 428. Unlike the user electronic device 380 (as described with respect to FIG. 3), the user electronic device 480 enables to the user 410 to view real objects in addition to the virtual environment 428.

Figure 5:
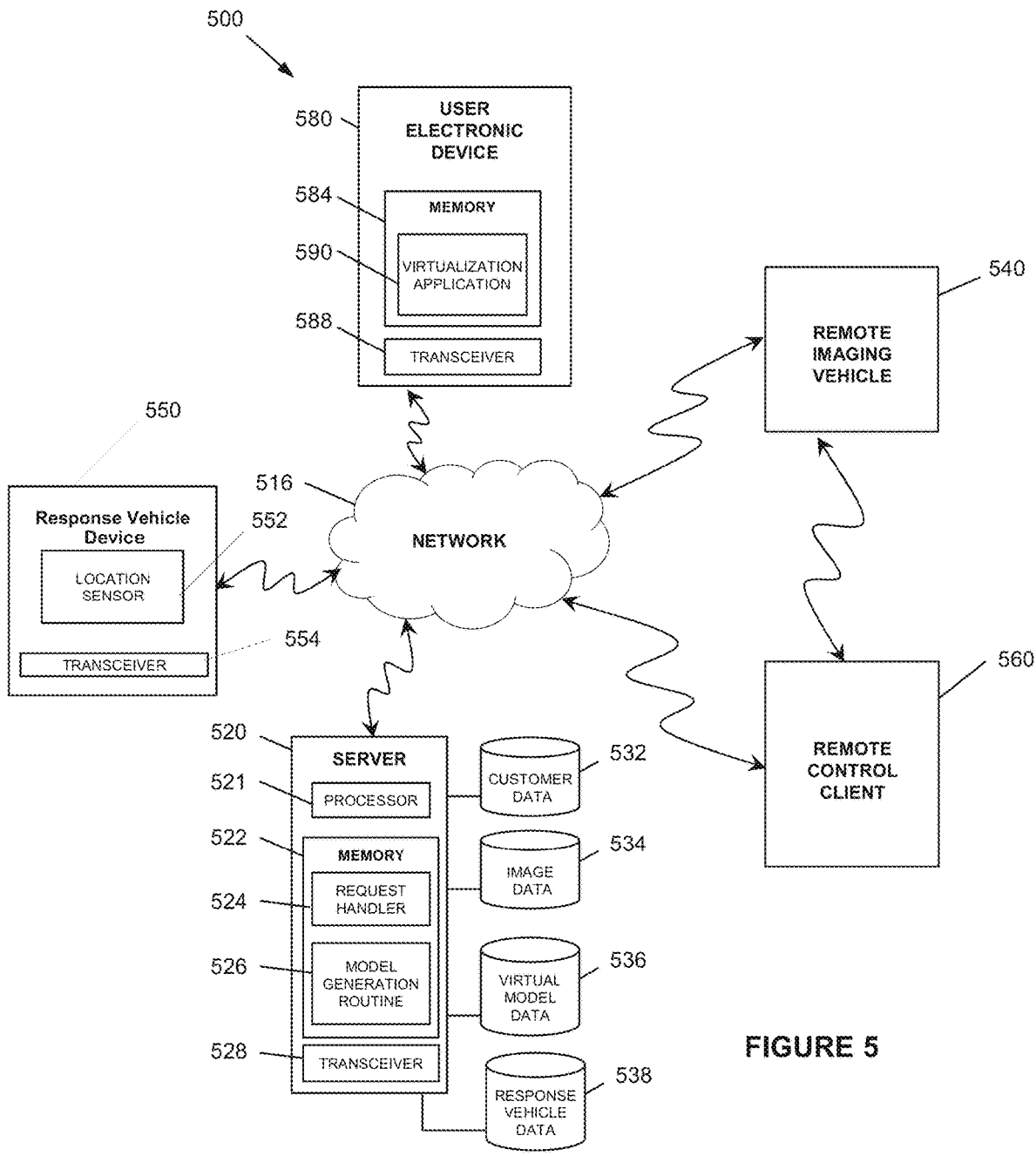
FIG. 5 depicts a block diagram of an exemplary system that may remotely control an imaging vehicle and/or render virtual models.

FIG. 5 depicts a block diagram of an exemplary system 500 that may enable remotely controlling an imaging vehicle 540 and/or render virtual models. As illustrated, the system 500 may include a server 520, the imaging vehicle 540, a remote control client 560, and a user electronic device 580 which communicate with one another via a communication network 516. The communication network 516 may include one or more wired or wireless communication links.

The server 520 may include one or more processors 521 and a memory 522 that stores one or more applications. The one or more processors 521 may interface with the memory 522 to execute the one or more applications. The memory 522 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

One application stored at the memory 522 may be a request handler 524 that processes requests received from the user electronic device 580. For example, the user may request access to customer data stored at a customer database 532, to deploy an emergency services vehicle to a particular location, and/or to dispatch the imaging vehicle 540 to capture a set of image data of an indicated region. Another application stored at the memory 522 may be a model generation routine 526 that generates virtual models based on image data stored at an image database 534, stores the virtual models in a virtual model database 536, and/or generates a virtual environment based on one or more virtual models stored at the virtual model database 536. In some embodiments, the virtual environment may also include virtual representations indicative of response vehicles based upon data stored at a response vehicle database 538. Although FIG. 5 illustrates that databases 532-538 are separate from the server 520, in some embodiments, the memory 522 locally stores the databases 532-538. It should be appreciated that the memory 522 may store additional applications and/or data.

The server 520 may also include one or more transceivers 528 configured to communicate over the communication network 516. More particularly, the one or more transceivers 528 may be VWVAN, WLAN, and/or WPAN transceivers functioning in accordance with IEEE standards, 3GPP standards, or other standards, to receive and transmit data over the communication network 516. In some embodiments, the server 520 may perform the functionalities as discussed herein as part of a "cloud" network, or may otherwise communicate with other hardware or software components within the cloud to send, retrieve, and/or otherwise interact with data.

As illustrated, the server 520 may communicate with the user electronic device 580 via the communication network 516. To this end, the user electronic device 580 may include one or more transceivers 588 configured to communicate over the communication network 516. The user electronic device 580 may also include a memory 584. The memory 584 may include a virtualization application 590 that is executed by one or more processors to display a virtual environment that includes a rendering of one or more of the virtual models that are stored in the model database 536.

As illustrated, the server 520 may also communicate with the remote control client 560 via the communication network 516 to control operation of the remote imaging vehicle 540. To this end, the server 520 may transmit an instruction to the remote control client 560 to dispatch the remote imaging vehicle 540 to capture image date representative of a particular location. Accordingly, in response to receiving the instruction, a remote control client 560 may transmit one or more control commands to the remote imaging vehicle 540 to cause the remote imaging vehicle 540 to capture the request image data. In some embodiments, the server 520 controls the operation of the imaging vehicle 540 directly without the use of the remote control client 560.

Additionally, the server 520 may also communicate with a response vehicle device 5550 via the communication network 516. In some embodiments, the response vehicle device 550 is a computer system embedded into a response vehicle. In other embodiments, the response vehicle device 550 is a personal electronic device carried by an operator and/or occupant of the response vehicle. The response vehicle device 550 may include one or more location sensors 552, such as GPS sensors, that detect a location of the response vehicle. Accordingly, the response vehicle device 550 may transmit the location sensed by the location sensors 552 to the server 520 via the communication network 516 from one or more transceivers 554. Additionally or alternatively, the response vehicle device 550 may track and/or report the status of one or more tasks associated with the response vehicle.

Further, the response vehicle device 550 may include one or more applications (not depicted), such as a mapping application capable of providing instructions to an operator of the response vehicle to navigate the overall region to a particular location. As described herein, after a disaster, traditional routes may be untraversable. Thus, the mapping application may be configured to generate instructions to follow a route that includes off-road portions. According to aspects, the server 520 may be configured to generate and transmit the routes to the response vehicle device 550 via the communication network 516. The one or more applications may also include a task management application that monitors and/or reports the status of tasks associated with the response vehicle.

Figure 6:
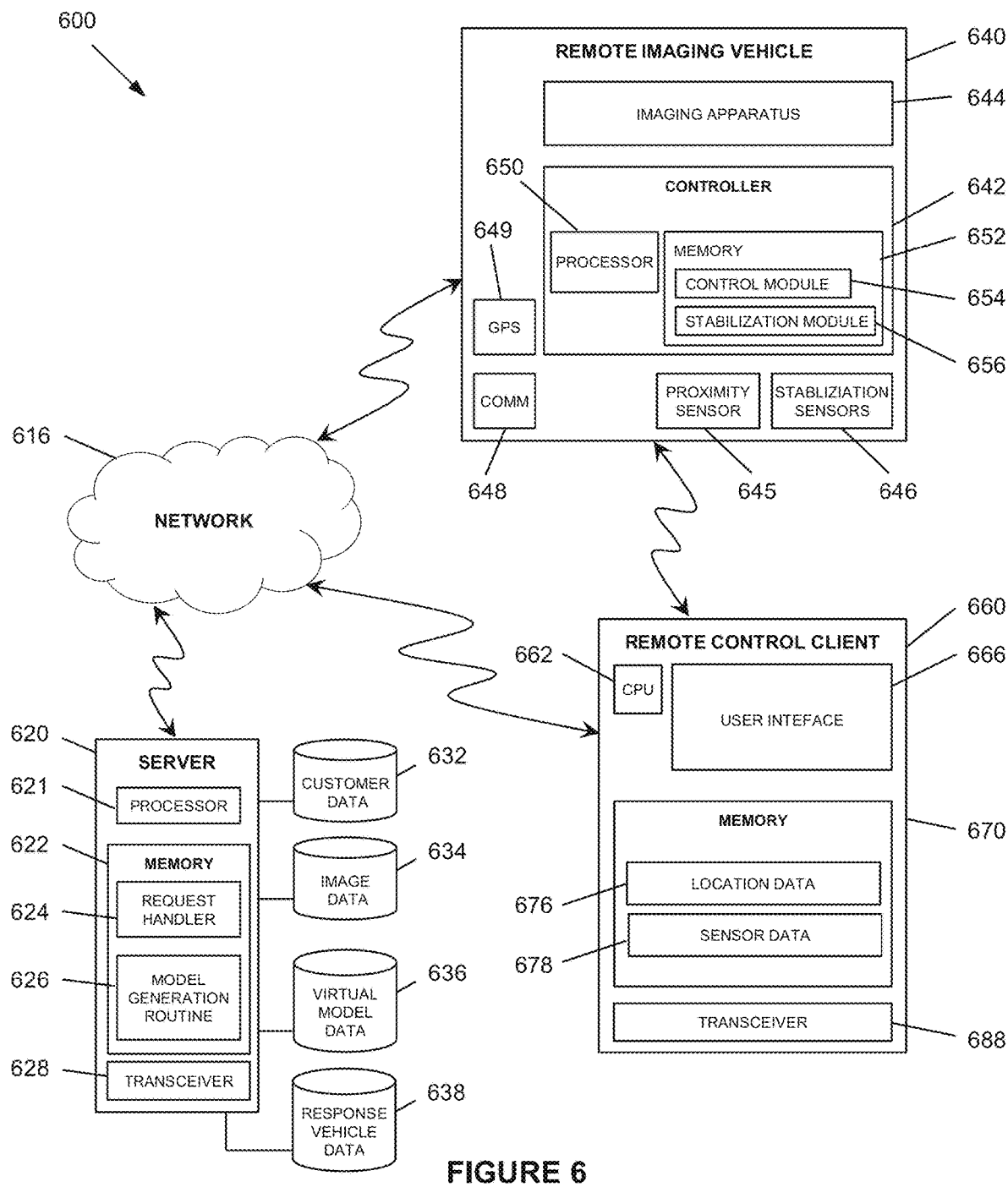
FIG. 6 depicts a block diagram of an exemplary imaging vehicle control system for remotely controlling an imaging vehicle.

FIG. 6 illustrates a block diagram of an exemplary imaging vehicle control system 600 configured to control a remote imaging vehicle 640 (such as the remote imaging vehicle 540 of FIG. 5). The remote imaging vehicle 640 may be controlled by a server 620 (such as the server 520 of FIG. 5) and/or a remote control client 660 (such as the remote control client 560 of FIG. 5). The remote control client 660, the remote imaging vehicle 640, and the server 620 may communicate with each other via a communication network 616 (such as the communication network 516 of FIG. 5). As described with respect to FIG. 5, the server 620 may include one or more processors 621 and a memory 622 that stores a request handler 624 and a model generation routine 626. The server 620 may also include or be connected to one or more databases, such as a customer database 632, an image database 634, a virtual model database 636, and a response vehicle database 638. The server 620 may include one or more transceivers 628 configured to communicate over the communication network 616.

The remote control client 660 may be any electronic device, for example, a control or command station computer, a laptop computer, a tablet computer, a smartphone, etc. The remote control client 660 may include one or more processors 662 configured to execute applications stored at a computer-readable memory 670. The memory 670 may be a computer-readable non-transitory storage device that includes persistent (e.g., a hard disk) and/or non-persistent (e.g., RAM) memory components. For example, the memory 670 may store location data 676 and/or sensor data 678.

The remote control client 660 may include the user interface module 666 which may include drivers that support user input devices such as a button, a keyboard, a mouse, a toggle, a joystick, a wheel, or any other input device including those that simulate the appearance of a cockpit. The remote control client 660 may also include one or more transceivers 688 configured to communicate over the communication network 616, for example, to receive commands from the server 620 and/or to control operations of the remote imaging vehicle 640.

The remote imaging vehicle 640 may include a controller 642 that controls operation of one or more proximity sensors 645, one or more stabilization sensors 646, a Global Positioning System (GPS) unit 649, and/or an imaging apparatus 644. The controller 642 may include one or more processors 650 configured to execute instructions stored at a computer-readable memory 652 to control operation of the remote imaging vehicle 640. To this end, the controller 642 may be remotely controlled by one or more commands received from the remote control client 660 and/or the server 620.

Accordingly, the remote imaging vehicle 640 may include a communication module 648 including one or more transceivers configured to communicate over the communication network 616, for example, to receive control commands and/or to transmit image data captured by the imaging apparatus 644.

When in operation, the controller 642 may invoke a stabilization module 656 to retrieve data from stabilization sensors 646 (e.g., directional speed sensors, rotational speed sensors, tilt angle sensors, inertial sensors, and/or accelerometer sensors) to control movement of the remote imaging vehicle 640. To this end, the stabilization module may implement one or more control functions that perform PID (proportional-integral-derivative), fuzzy logic, nonlinear, etc. control to maintain the stability of the remote imaging vehicle 640. In response to receiving commands from the server 620 and/or remote control client 660, the controller 642 may analyze data retrieved from these stabilization sensors 646 to control the stability of the remote imaging vehicle 640 as the remote imaging vehicle 640 traverses a path, thereby improving the quality of the image data captured by the imaging apparatus 644.

In some embodiments, the proximity sensors 645 are configured to detect nearby objects, obstructions, etc. that may hinder movement of the remote imaging vehicle 640. These proximity sensors 645 may include any sensors that may assist the control module 654 in determining a distance and a direction to any nearby object. The one or more proximity sensors 645 may include ultrasonic sensors, infrared sensors, LIDAR (Light Detection and Ranging), a stereo vision system (SVS) that may utilize the imaging apparatus 644.

The controller 642 may utilize locationing techniques to ensure that the remote imaging vehicle 640 follows a determined path. To this end, the GPS unit 649 may be configured to implement a positioning protocol, such as "Assisted GPS" (A-GPS), satellite GPS, or any other suitable global positioning protocol or system. For example, A-GPS utilizes terrestrial cell phone towers or W-Fi hotspots (e.g., wireless router points) to more accurately and more quickly determine location of the device. On the other hand, satellite GPS generally may be more useful in more remote regions that lack cell towers or W-Fi hotspots.

Figure 7:
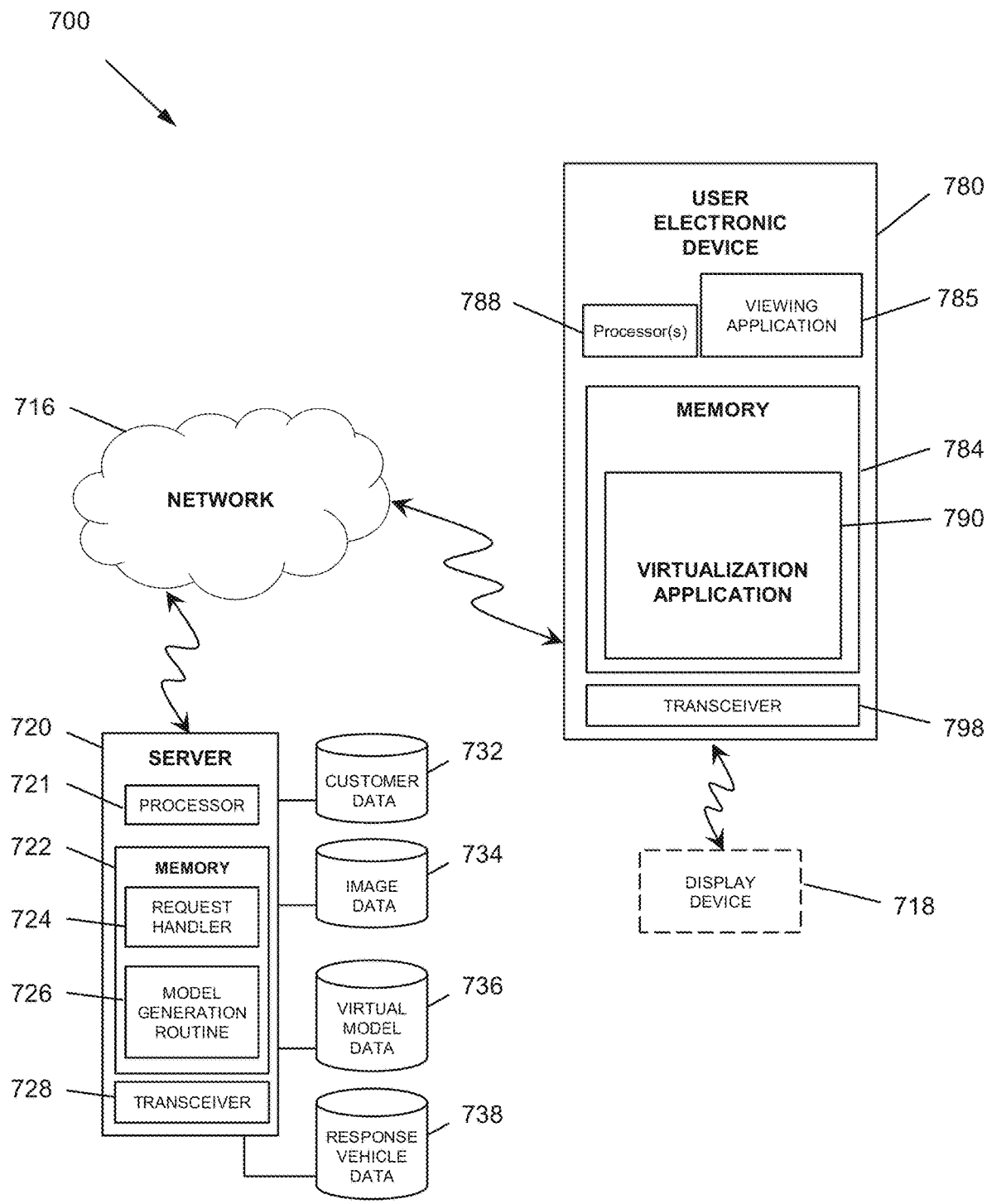
FIG. 7 depicts a block diagram of an exemplary visualization system for viewing virtual environments.

FIG. 7 illustrates a block diagram of an exemplary virtualization system 700 for viewing virtual environments. The visualization system 700 may include a server 720 (such as the server 520 of FIG. 5). As described with respect to FIG. 5, the server 720 may include one or more processors 721 and a memory 722 that stores a request handler 724 and a model generation routine 726. The server 720 may also include or be connected to one or more databases, such as a customer database 732, an image database 734, a virtual model database 736, and a response vehicle database 738. The server 720 may include one or more transceivers 728 configured to communicate over a communication network 716 (such as the communication network 516 of FIG. 5), for example, to render a virtual environment for display at a user electronic device 780 and/or a display device 718.

The user electronic device 780 may include one or more processors 788 configured to execute instructions stored at a memory 784. For example, the memory 784 may store a virtualization application 790 configured to present a virtual environment to a user. The processors 788 may include both central processing units (CPUs) and graphical processing units (GPUs). Accordingly, the GPUs may be utilized when performing activities related to rendering the virtual environment and the CPUs may be utilized when performing various other tasks, such as transmitting requests to the server 720.

In some embodiments, the virtualization application 790 presents the virtual environment locally at the user electronic device 780 via a viewing application 785. In other embodiments, the virtualization application 790 presents the virtual environment remotely via the display device 718. In these embodiments, the user electronic device 780 and the display device 718 may communicate over the communication network 716 and/or another communication network adapted for short range communications (such as a Wi-Fi network, a Bluetooth network, etc.). Accordingly, the user electronic device may include one or more transceivers 798 to configured to communicate over the communication network 716 and/or a short range communication network.

Figure 8:
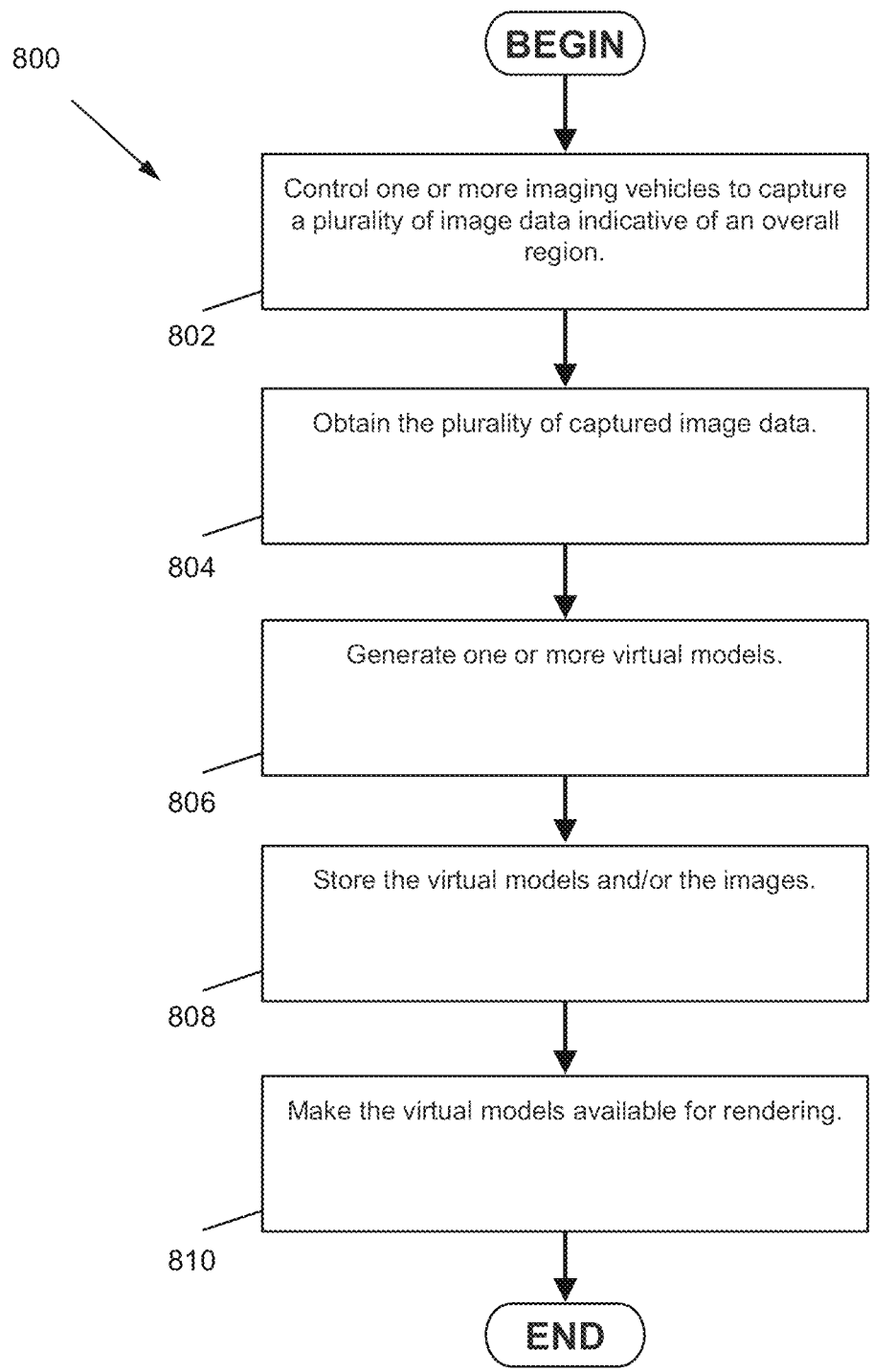
FIG. 8 depicts a flow chart of an example method for generating virtual models.

FIG. 8 depicts a flow chart of an example method 800 for generating virtual models. A server, such as the server 520 of FIG. 5, may perform the method 800. The method 800 may begin when the server controls one or more imaging vehicles (such as the imaging vehicle 540 of FIG. 5) to capture a plurality of image data of an overall region (block 802). To control the imaging vehicle, the server 120 may either transmit commands directly to the imaging vehicle or indirectly via a remote control client (such as the remote control client 560 of FIG. 5). To this end, the server may format the commands in accordance with a control API of the imaging vehicle. For example, the API may enable the server to control the path of the imaging vehicle and/or any of the image capture characteristics. In some scenarios, the command may indicate a target location within the overall region. Accordingly, the API may respond to an input of the target location by generating a series of control commands that navigates the imaging vehicle proximate to the target location.

As the imaging vehicle traverses the path, the imaging vehicle may capture a plurality of image data representative of the overall region. The imaging vehicle may embed the captured with metadata that indicates the location overall region and/or features thereof. For example, the metadata may include physical coordinates of the imaging vehicle, an altitude of the imaging vehicle, pan/tilt/zoom data of the imaging apparatus, a speed of the imaging vehicle, and/or other data that enables the correlation of captured image data to physical coordinates.

The manner in which the imaging vehicle captures the image data may also be controlled by the server. In one example, the server may send a command to capture image data in a sweep mode in which the imaging apparatus of the imaging vehicle is configured to capture image data from a wide angle so as to capture image data of larger portions of the overall region. In another example, the server may send a command to capture image data representative of a target location. In this example, the imaging vehicle may be configured to point the imaging apparatus at the target location from a variety of different angles as the imaging vehicle traverses the path.

In some embodiments, the imaging vehicle stores the captured image data locally until the image vehicle returns to a dock or port. Once arriving at the dock or port, the captured image data may be either transferred via a wired or wireless network servicing the dock or port, or by extracting a physical storage device from the imaging vehicle and inserting the physical storage device into a computing device configured to store captured image data. In other embodiments, to reduce the storage requirements at the imaging vehicle, the imaging vehicle may transmit the image data to a centralized location as the imaging vehicle captures the image data. In any case, the image data captured by the imaging vehicle is stored at an image database (such as the image database 534 of FIG. 5) interconnected to the server.

The server may then obtain the stored image from the image database (block 804). In one example, the server may be configured to automatically detect when new image data is added to the image database. In response, the server may be configured to obtain and process the newly added image data. In another example, a user executes a command that causes the server to obtain and process image data within the image database.

The server may then analyze the obtained image data to generate a virtual model of the overall region and/or the various features thereof (block 806). To this end, the server may input the image data and the corresponding embedded metadata to a model generation routine (such as the model generation routine 526 of FIG. 5). The model generation routine may apply photogrammetry techniques to identify edges, vertices, or surfaces of areas or structures of interest within the image data to segment the overall region into its various features. For example, the model generation routine may identify features across multiple images. Based on the known location and angle from which each image was captured, the model generation routine can utilize triangulation calculations to estimate three dimensional shape of the feature. The model generation routine may then correlate each feature to physical coordinates and/or an address at which each feature is located in the overall region. To generate a model, the model generation routine may analyze the image data to determine the dimensions of the modeled object and create a template three-dimensional object of the same dimensions. After the template object is generated, the model generation routine may generate a mesh for the object that utilizes the obtained image data. In embodiments in which the image data includes thermal or radiation image data, the model generation routine may generate multiple meshes for the same dimension. It should be appreciated that the virtual model for the overall region may be a composite model that includes virtual models for the various features thereof.

After generating the virtual models, the server may then compare the determined coordinates and/or addresses for each virtual model with a customer database, such as the customer database 532 of FIG. 5. If the coordinates and/or address of a virtual model matches coordinates and/or an address of a customer within the customer database, the server may link the virtual model to the customer record. Accordingly, any customer information associated with the feature is integrated into the virtual model.

The server may then store the generated virtual models in a model database, such as the model database 536 of FIG. 5 (block 808). More particularly, the model of overall region and the model of any feature of the overall region are stored at the model database.

By storing the virtual models in the model database, the server makes available the virtual models for use in rendering a virtual environment (block 810). According to aspects, the user electronic device may transmit a request to view a virtual environment that includes the overall region. In some embodiments, the server may transmit the virtual models to a user electronic device to render the virtual environment. In response the server may query the model database and provide any models that match the request. In other embodiments, the server may generate and provide the virtual environment to the user electronic device for rendering.

Further, because the virtual models are linked to the customer records, as the customer records are updated over time, the updates may be automatically propagated into any overlays or informational displays included in the virtual environment.

Figure 9:
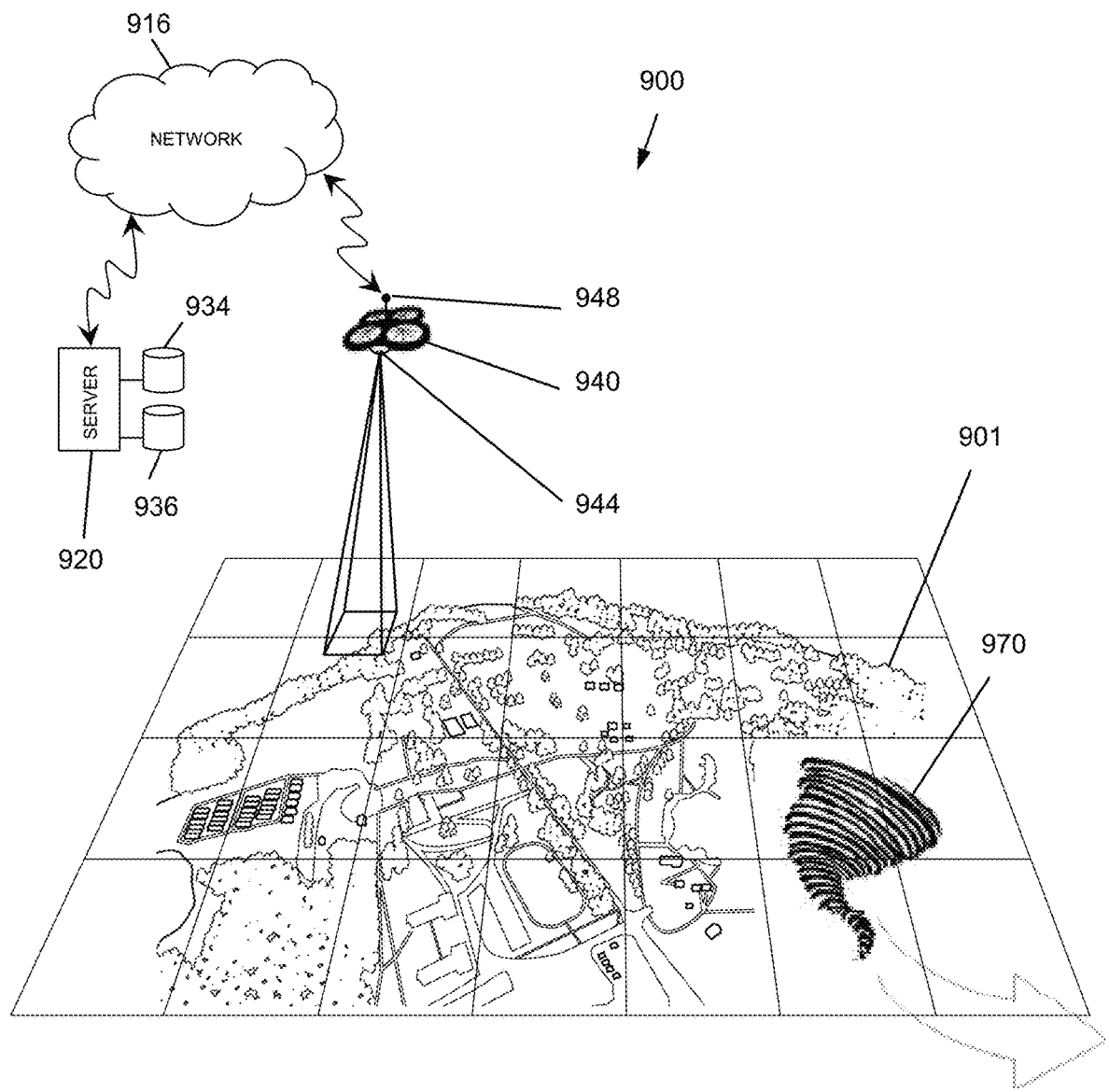
FIG. 9 depicts an example environment wherein an imaging vehicle captures a set of image data representative of an overall region after a disaster (e.g. a tornado) has occurred.

FIG. 9 depicts an example environment 900 wherein one or more exemplary imaging vehicles 940 (such as the imaging vehicle 540 of FIG. 5) captures a set of image data of an overall region 901 after a disaster 970 (e.g. a tornado) has occurred. The imaging vehicle 940 may be an aerial drone equipped with an imaging apparatus 944 configured to capture image data of the overall region 901. The imaging vehicle 940 may also be equipped with a communication apparatus 948 configured to facilitate communications over a wireless network 916 (such as the communication network 516 of FIG. 5). For example, a server 920 (such as the server 520 of FIG. 5) and/or a remote control client (such as the remote control client 560 of FIG. 5) may control travel and/or image capture characteristics by transmitting control commands over the network 916 to the imaging vehicle 940. Additionally, the imaging vehicle 940 may transmit captured image data to the server 920 via the communication network 916. According to aspects, the imaging vehicle 940 embeds the captured image data with metadata such as a time stamp and/or location data.

After receiving the image data, the server 920 may store the image data at an image database 934 (such as the image database 534 of FIG. 5). The server 920 may organize the image database 934 based on the metadata associated with the image data. Accordingly, for example, the image data captured by the imaging vehicle 140 of FIG. 1 prior to the disaster 970 occurring can be stored separately from the image data captured by the imaging vehicle 940 after the disaster 970 occurred.

The server 920 may then convert the image data captured by imaging vehicle 940 into virtual models of the overall region 910 and/or features thereof. The server 940 may then store the virtual models at a model database 936 (such as the model database 536 of FIG. 5). The server 920 may organize the model database 936 based on the embedded metadata. To this end, the server 920 may determine that embedded location data of a virtual model generated based on the image data captured by the imaging vehicle 940 is located at a same or similar location as a virtual model already stored in the model database 936. Accordingly, the server 920 may determine that the newly generated virtual model is an updated version of the currently stored virtual model.

Figure 10:
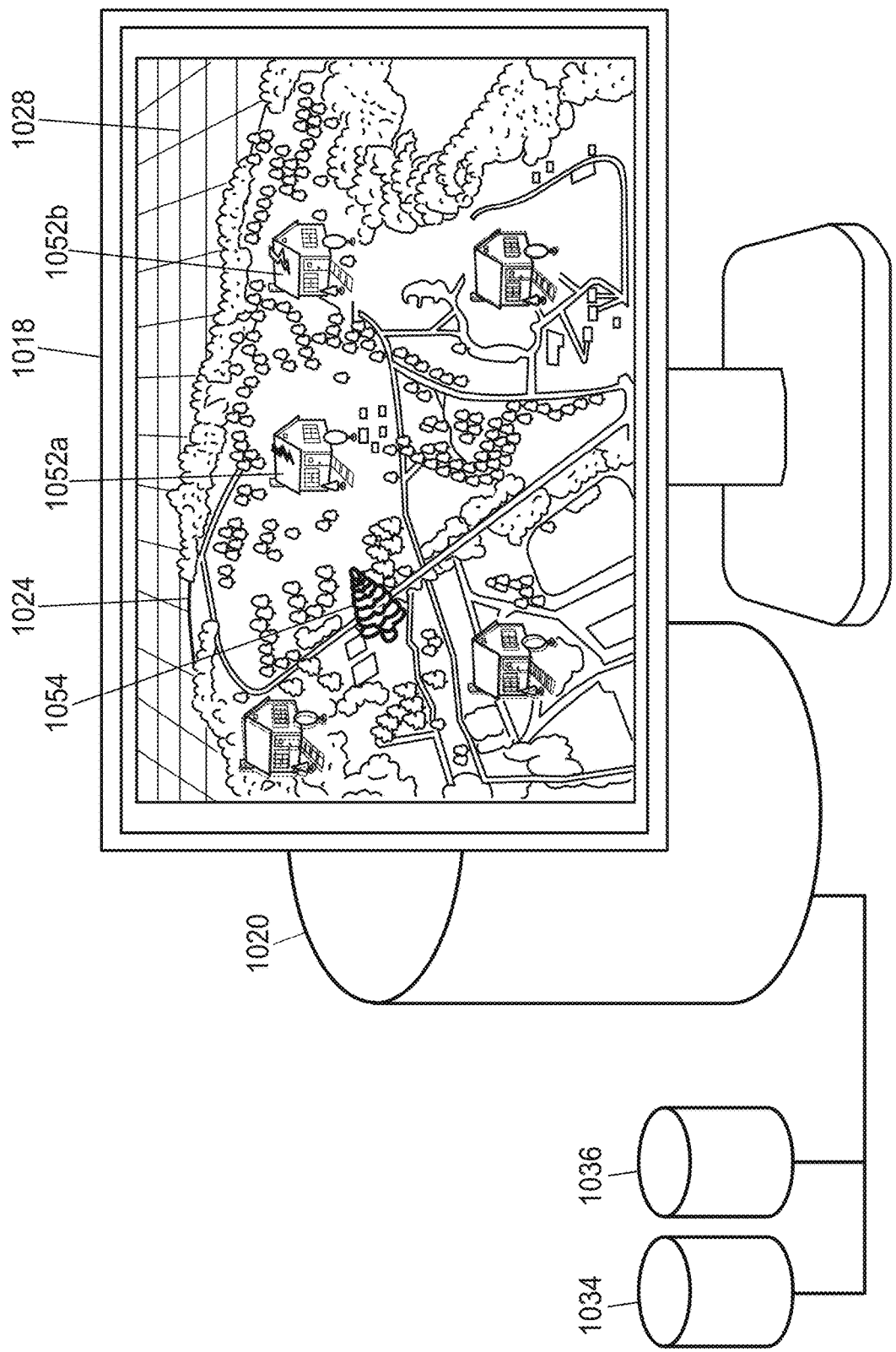
FIG. 10 depicts an exemplary virtual environment that includes a virtual model of an overall region after a disaster.

FIG. 10 depicts a rendering 1024 of an exemplary virtual model of an overall region (such as the overall region 901 of FIG. 9) within a virtual environment 1028 after a disaster has occurred. As illustrated, the virtual environment 1028 is displayed on an exemplary display unit 1018. The virtual environment 1028 may include one or more models of features 1052*a* and 1052*b* that have been damaged by a disaster. Additionally, the virtual environment 1028 may include a feature 1054 that renders a roadway non-traversable. In the illustrated embodiment, a server 1020 (such as the server 520 of FIG. 5) may access a model database 1036 (such as the model database 536 of FIG. 5) to obtain the virtual models of the features 1052 and 1054. Accordingly, the server 1020 may generate the virtual model of features 1052 and 1054 based on updated image data stored at an image database 1034 (such as the image database 534 of FIG. 5).

Figure 11:
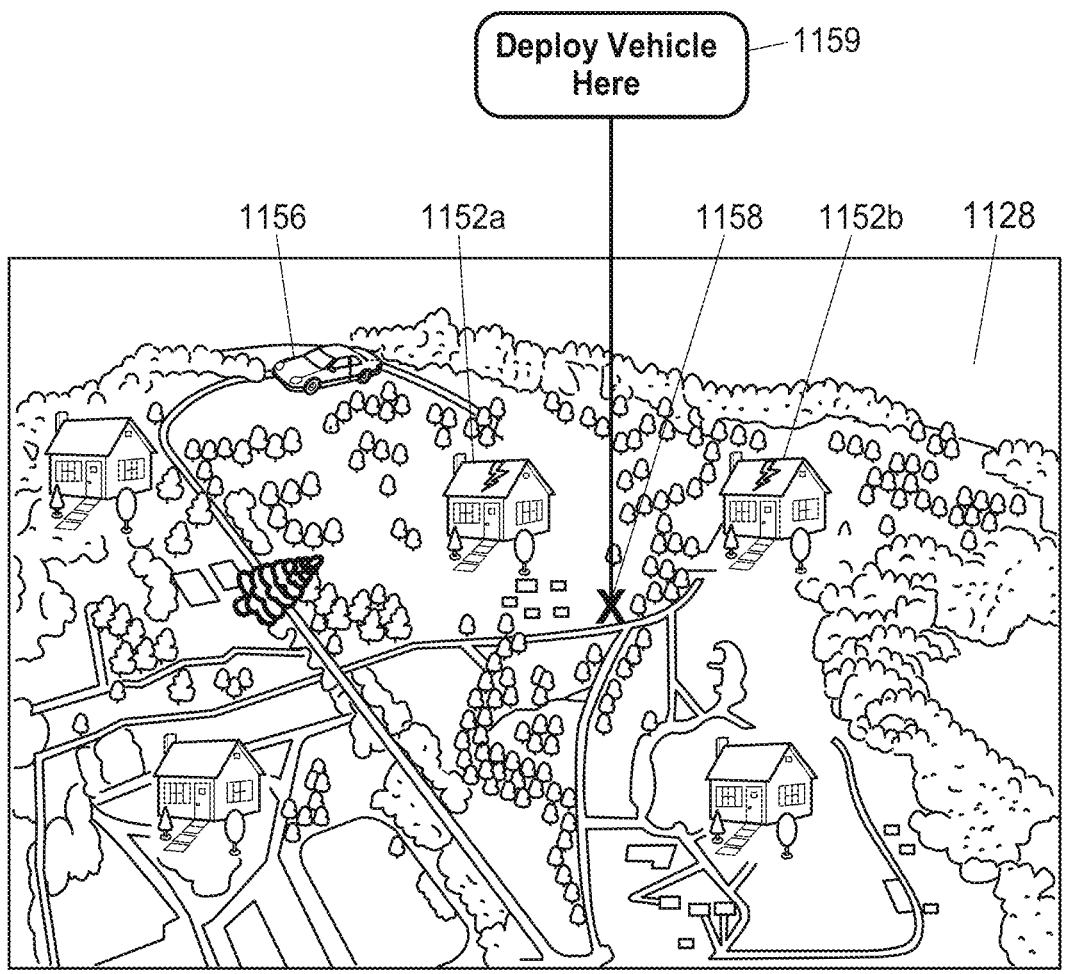
FIG. 11 depicts a virtual environment in which an overlay associated with deploying a response vehicle at a target location is rendered therein.

FIG. 11 depicts a virtual environment 1128 in which an overlay 1159 associated with deploying a response vehicle at a target location 1158 within the overall region is rendered therein. The virtual environment 1128 may be rendered by a user electronic device (such as the user electronic device 580 of FIG. 5). According to aspects, the virtual environment 1128 may include a visual representation of a response vehicle 1156. It should be appreciated that virtual representation of a response vehicle 1156 may not be a virtual model of the response vehicle. To this end, unlike some properties represented by the virtual models, the response vehicle may be mobile and actually be located in places other than as indicated by the image data stored at an image database (such as the image database 534 of FIG. 5). That said, the visual representation of the response vehicle 1156 may still be generated based upon the application of virtual modeling techniques to the response vehicle.

Further, because the response vehicle is mobile, the location of the virtual representation of the response vehicle 1156 may be dynamically updated. To this end, a locationing sensor (such as a GPS sensor) associated with the response vehicle may report the location of the response vehicle to a server (such as the server 520 of FIG. 5). In response, the server may store the location of the response vehicle in a database (such as the response vehicle database 538 of FIG. 5). Accordingly, when a user electronic device renders the virtual environment 1128, the user electronic device may periodically poll the server for the most recent location of the response vehicle. The user electronic device may then render the virtual representation of the response vehicle 1156, and any associated overlays, at a virtual location determined based on a conversion of the polled response vehicle location.

In one scenario, a user interacts with the user electronic device to indicate the target location 1158. For example, the user may interact with a virtual representation of a response vehicle 1156 to cause the user electronic device to render an overlay (not depicted) associated with the response vehicle in the virtual environment 1128. From the overlay, the user may select an option to manually indicate the target location 1158 by interacting with the virtual environment 1128 at the target location 1158. In another example, the user interacts with the virtual environment 1128 at the target location 1158 to cause the user electronic device to render an overlay (not depicted) associated with the target location 1158. From the overlay, the user may select an option that enables the user to select a particular response vehicle to deploy to the target location 1158.

In other scenarios, the server automatically determines the target location 1158. For example, the server may analyze the location of damaged properties 1152 and to identify a location proximate the damaged properties 1152 and still safe from any hazards caused by the disaster. Additionally or alternatively, the server may utilize an algorithm derived by machine learning to identify the target location 1158. To this end, when the server determines that a disaster has occurred (such as by analyzing the model database and/or the customer database), the server may input the model data and/or the customer records into the derived algorithm. The derived algorithm may then analyze the location of damaged properties and/or areas made unsafe by the disaster to identify the target location 1158 such that the response vehicle is best able to respond to the disaster. According to aspects, the derived algorithm may also analyze the capabilities of the various response vehicles stored at the response vehicle database. For instance, the derived algorithm may determine that a medical assistance response vehicle should be located closer to damaged areas than, say, a mobile response operations center.

Figure 12:
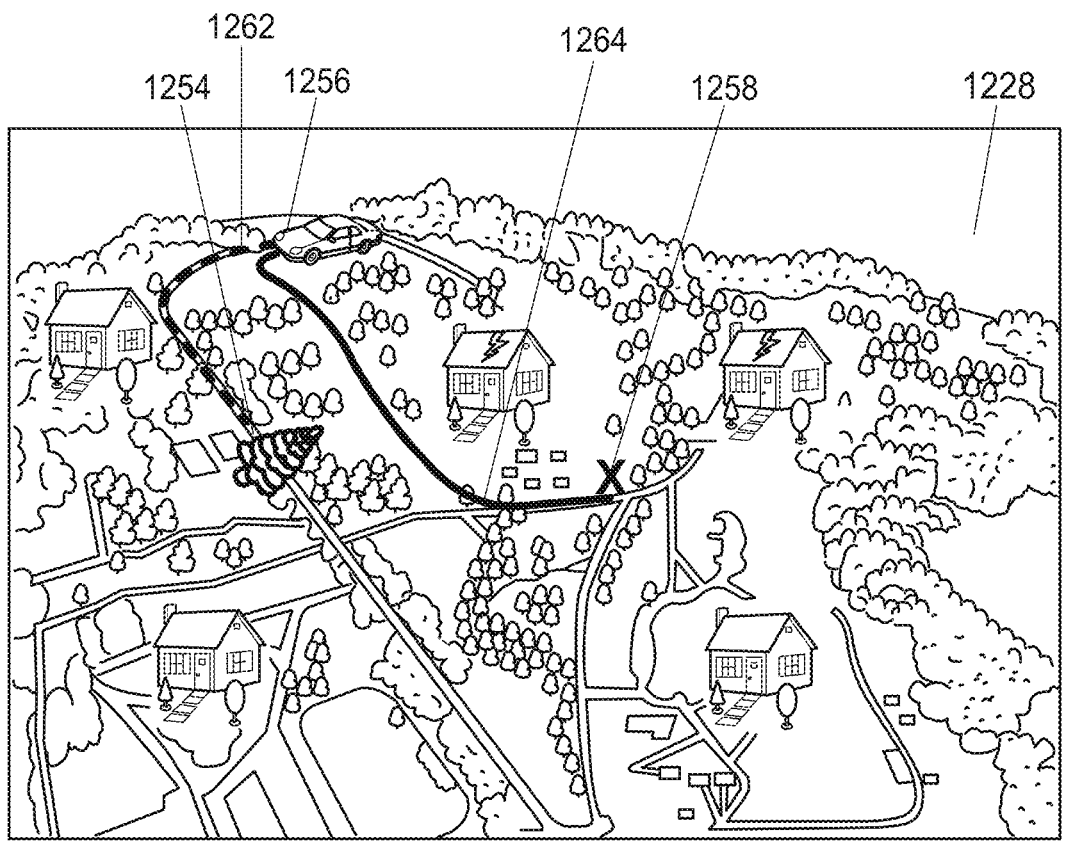
FIG. 12 depicts a virtual environment in which an overlay showing a route for the response vehicle to traverse is rendered therein.

FIG. 12 depicts a virtual environment 1228 in which an overlay 1264 showing a route for a response vehicle to traverse is rendered therein. The virtual environment 1228 may rendered by a user electronic device (such as the user electronic device 580 of FIG. 5), for example, in response to a server (such as the server 520 of FIG. 5) determining a location of a target location 1258 within the overall region at which the response vehicle should be deployed. To this end, server may analyze the current location of the response vehicle and the target location 1258 to determine the route. Accordingly, the virtual environment 1228 may include a virtual representation of the response vehicle 1256 and the overlay 1264 indicating the route.

To generate the route, the server may execute a pathfinding algorithm that determines a route from along one or more roadways. However, unlike traditional pathfinding techniques, the server may also analyze the virtual model of the overall region to identify if a roadway that is normally traversable, is rendered untraversable by the damage to the region. For example, when attempting to generate route 1262, the server may detect that tree 1254 is blocking the roadway by analyzing virtual model data. Thus, the server may generate another route, such as the one that corresponds to the overlay 1264, instead.

According to aspects, the server may also generate routes based on any off-road capabilities of the response vehicle. To this end, a record in a response vehicle database (such as the response vehicle database 538 of FIG. 5) may indicate the off-road capabilities. Accordingly, if the response vehicle is capable of traversing off-road terrain, the server may generate routes that include off-road portions. For example, the route corresponding to the illustrated overlay 1264 includes an off-road portion to avoid the tree 1254. It should be appreciated that in some scenarios the route may be entirely off-road. For example, in a flood scenario, an aquatic response vehicle may be deployed. Thus, the server may analyze the virtual model of the overall region to identify water-based pathways for the aquatic response vehicle to traverse.

Figure 13:
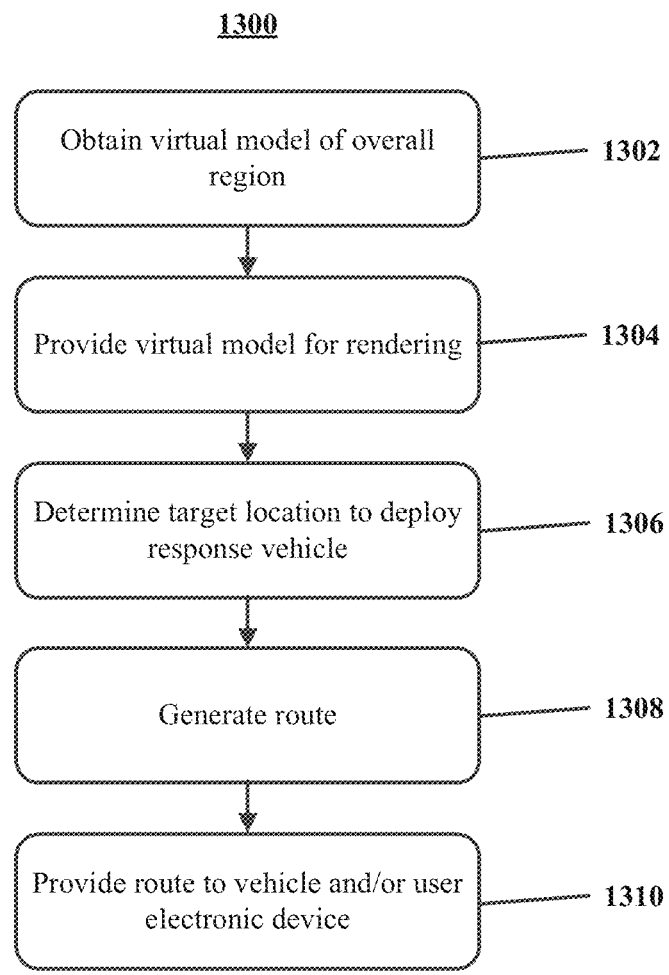
FIG. 13 depicts a flow chart of an example method for deploying response vehicles.

FIG. 13 depicts a flow chart of an example method 1300 for deploying response vehicles based on a virtual environment. The method may be executed by a server (such as the server 520 of FIG. 5) in communication with a user electronic device (such as the user electronic device 580 of FIG. 5). The method 1300 may begin when the server obtains a virtual model of an overall physical region (block 1302). As described herein, the model of the overall region may be stored in a model database (such as the model database 536 of FIG. 5) and generated based on image data stored in an image database (such as the image database 534 of FIG. 5) after being captured by an imaging vehicle (such as the imaging vehicle 540 of FIG. 5). The virtual model of the overall region may be based on image data captured after a damage-causing event impacted the overall region.

At block 1304, the server may provide a virtual environment including the virtual model of the overall region to the user electronic device for rendering. To support the rendering of the virtual environment, the server may correlate the virtual coordinates of the virtual environment with corresponding geographic coordinates of the overall region. Accordingly, the virtual coordinates at which each feature of the virtual environment is located are correlated to the corresponding geographic coordinates at which the physical feature is located within the overall region. As a result, the server creates a match between specific regions within the virtual environment and corresponding specific regions within the overall region.

Depending on the particular type of user electronic device, the server may generate a mixed reality environment in which both virtual objects and physical objects may be viewed, or a virtual reality environment in which only virtual objects may be viewed. Accordingly, when a user attempts to view a virtual environment, the user electronic device may transmit an indication of the type(s) of environments the user electronic device supports. In embodiments that implement communication networks having sufficiently low latency, the user electronic device may also indicate whether to process the rendering locally at user electronic device or remotely at the server.

At block 1306, the server may determine a target location within the overall region at which a response vehicle should be deployed. As described above, the determination may be based on user indications provided by the user electronic device or automatically determined by the server. Accordingly, in the user-indication scenario, the server may determine the location at which to deploy the response vehicle by receiving an indication of the location from the user electronic device. On the other hand, in the automatic scenario, the server may analyze the virtual model of the overall region to identify a location proximate to areas that were damaged by the damage-causing event. It should be appreciated that the proximity may vary depending on the type of response vehicle. To this end, response vehicles associated with search and rescue may be deployed closer to the damaged area than response vehicles that function as mobile operations centers. In some embodiments, the server implements an algorithm derived by machine learning that analyzes the virtual model of the overall region and any customer or response vehicle data to determine the location at which the response vehicle should be deployed.

At block 1308, the server may generate a route from a current location of the response vehicle to the target location. It should be appreciated that unlike traditional mapping/route-generation techniques, the server may analyze the virtual model of the overall region to identify normally-traversable roadways that have been damaged or blocked by the damage-causing event. Accordingly, the route generated by the server may avoid any roadways that were made untraversable by the damage-causing event. To this end, the server may generate a route that includes an off-road portion that, based on an indication in a record corresponding to the response vehicle, can be traversed by the response vehicle. In flood scenarios where aquatic response vehicles are being deployed, the off-road portions may include flooded areas. After the server generates the route, the server may include an indication of the route in the record of the response vehicle in the response vehicle database.

In some embodiments, a user may interact with the virtual environment rendered by the user electronic device to trace a route for the vehicle to traverse. For example, after the user indicates the target location, the user may be presented an interface that enables the user to manually generate a route. As another example, the user electronic device may combine the interfaces to indicate the route to a target location. To this end, the user electronic device may interact with a virtual representation of the response vehicle to present the route-indication. In this scenario, the indication of the target location may be the end point of the route indicated by the user. Regardless, after the user finishes indicating the route, the user electronic device may transmit an indication of the route to the server. Accordingly, in these embodiments, the server may determine the route by receiving a user-indicated route from the user electronic device.

At block 1310, the server may provide the route to at least one of a response vehicle device (such as the response vehicle device 550 of FIG. 5) or the user electronic device. When the server transmits the route to the response vehicle device, the response vehicle device may launch a navigation and/or mapping application that presents instructions for an operator of the response vehicle to follow the route. On the other hand, when the server transmits the route to the user electronic device, the user electronic device may render an overlay in the virtual environment that indicates the route. It should be appreciated that while the method 1300 describes deploying a single response vehicle, the server may deploy any number of response vehicles using the disclosed techniques.

Of course, the server may populate other overlays of the virtual environment with information associated with the response vehicle. To this end, the server may access the record associated with the response vehicle at the response vehicle database to provide any additional information. For example, the response vehicle device may include a task management application that tracks tasks (e.g., rescue person, assess damage, establish base, distribute aid, and so on) assigned to the response vehicle. Accordingly, the task management application may transmit any updates associated with the task to the server. In response, the server may update the record for the response vehicle with the received task information. Thus, in addition to the route, the server can populate an overlay in the virtual environment that relates to, for example, task status.

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer-implemented method comprising:
    receiving a plurality of images captured by an image sensor disposed on an imaging vehicle, the plurality of images representing a physical region including a ground surface of the physical region;
    determining damage to an object represented in one or more images of the plurality of images;
    determining a damage location associated with the object on the ground surface of the physical region;
    determining a target location on the ground surface of the physical region;
    generating a ground-based route from a current location of a response vehicle on the ground surface of the physical region, to the target location, wherein the ground-based route is based at least in part on the damage location;
    generating a virtual model of the physical region based at least in part on the plurality of images, the virtual model including a graphical representation of the ground-based route along the ground surface of the physical region, the current location, and the target location; and
    providing the virtual model to a rendering device via a network.

2. The computer-implemented method of claim 1, wherein the virtual model comprises a mixed reality virtual model including a rendering of the object.

3. The computer-implemented method of claim 1, wherein determining the target location comprises:
    identifying a ground-based physical location proximate to the damage location.

4. The computer-implemented method of claim 1, wherein generating the ground-based route comprises:
    determining that a ground-based physical roadway is non-traversable based on the plurality of images;
    determining a first ground-based route from the current location of the response vehicle to the target location, wherein the first ground-based route includes the non-traversable physical roadway;
    determining a second ground-based route from the current location of the response vehicle to the target location, wherein the second ground-based route does not include the non-traversable physical roadway; and
    selecting the second ground-based route to be represented in the virtual model.

5. The computer-implemented method of claim 1, further comprising:
    determining an off-road capability of the response vehicle; and
    determining, based on the off-road capability of the response vehicle, that an off-road portion of the ground-based route is traversable by the response vehicle.

6. The computer-implemented method of claim 1, wherein receiving the plurality of images comprises:
    determining an image capture characteristic for the imaging vehicle, based at least in part on the physical region and one or more capabilities of the imaging vehicle; and
    transmitting a control command to the imaging vehicle, the control command identifying the image capture characteristic.

7. The computer-implemented method of claim 6, wherein the imaging vehicle is an aerial imaging drone, and wherein the image capture characteristic comprises at least one of an image resolution, an image angle, an altitude from which image data is captured, or a travel path of the aerial imaging drone.

8. The computer-implemented method of claim 1, wherein generating the virtual model comprises:
    extracting metadata from the plurality of images, the metadata including at least timestamp data and location data associated with the plurality of images;
    determining a first subset of the plurality of images captured prior to the damage occurring at the damage location within the physical region, based at least in part on the timestamp data;
    generating a first version of the virtual model based on the first subset of the plurality of images;
    determining a second subset of the plurality of images captured subsequent to the damage occurring at the damage location within the physical region, based at least in part on the timestamp data; and generating a second version of the virtual model based on the first subset of the plurality of images.

9. The computer-implemented method of claim 1, further comprising:
executing an algorithm, derived by machine learning, to determine the target location on the ground surface of the physical region;
identifying the response vehicle based at least in part on the target location; and
transmitting a signal identifying the target location to the response vehicle.

10. A computer system comprising:
one or more processors; and
one or more non-transitory computer-readable media storing computer-executable instructions that, when executed, cause the one or more processors to perform operations comprising:
receiving a plurality of images captured by an image sensor disposed on an imaging vehicle, the plurality of images representing a physical region including a ground surface of the physical region;
determining damage to an object represented in one or more images of the plurality of images and determining a damage location associated with the object on the ground surface of the physical region;
determining a target location on the ground surface of the physical region;
generating a ground-based route from a current location of a response vehicle on the ground surface of the physical region, to the target location, wherein the ground-based route is based at least in part on the damage location; and
generating a virtual model of the physical region based at least in part on the plurality of images, the virtual model including a graphical representation of the ground-based route along the ground surface of the physical region, the current location, and the target location; and
providing the virtual model to a rendering device via a network.

11. The computer system of claim 10, wherein the virtual model comprises a mixed reality virtual model including a rendering of the object.

12. The computer system of claim 10, wherein determining the target location comprises:
identifying a ground-based physical location proximate to the damage location.

13. The computer system of claim 10, wherein generating the ground-based route comprises:
determining that a ground-based physical roadway is non-traversable based on the plurality of images;
determining a first ground-based route from the current location of the response vehicle to the target location, wherein the first ground-based route includes the non-traversable physical roadway;
determining a second ground-based route from the current location of the response vehicle to the target location, wherein the second ground-based route does not include the non-traversable physical roadway; and
selecting the second ground-based route to be represented in the virtual model.

14. The computer system of claim 10, wherein generating the ground-based route comprises:
determining an off-road capability of the response vehicle; and
determining, based on the off-road capability of the response vehicle, that an off-road portion of the ground-based route is traversable by the response vehicle.

15. The computer system of claim 10, wherein receiving the plurality of images comprises:
determining an image capture characteristic for the imaging vehicle, based at least in part on the physical region and one or more capabilities of the imaging vehicle; and
transmitting a control command to the imaging vehicle, the control command identifying the image capture characteristic.

16. The computer system of claim 15, wherein the imaging vehicle is an aerial imaging drone, and wherein the image capture characteristic comprises at least one of an image resolution, an image angle, an altitude from which image data is captured, or a travel path of the aerial imaging drone.

17. The computer system of claim 10, wherein generating the virtual model comprises:
extracting metadata from the plurality of images, the metadata including at least timestamp data and location data associated with the plurality of images;
determining a first subset of the plurality of images captured prior to the damage occurring at the damage location within the physical region, based at least in part on the timestamp data;
generating a first version of the virtual model based on the first subset of the plurality of images;
determining a second subset of the plurality of images captured subsequent to the damage occurring at the damage location within the physical region, based at least in part on the timestamp data; and
generating a second version of the virtual model based on the first subset of the plurality of images.

18. The computer system of claim 10, the operations further comprising:
executing an algorithm, derived by machine learning, to determine the target location on the ground surface of the physical region;
identifying the response vehicle based at least in part on the target location; and
transmitting a signal identifying the target location to the response vehicle.

19. One or more non transitory computer readable media storing instructions executable by a processor, wherein the instructions, when executed, cause the processor to perform operations comprising:
receiving a plurality of images captured by an image sensor disposed on an imaging vehicle, the plurality of images representing a physical region including a ground surface of the physical region;
determining damage to an object represented in one or more images of the plurality of images and determining a damage location associated with the object on the ground surface of the physical region;
determining a target location on the ground surface of the physical region;
generating a ground-based route from a current location of a response vehicle on the ground surface of the physical region, to the target location, wherein the ground-based route is based at least in part on the damage location; and
generating a virtual model of the physical region based at least in part on the plurality of images, the virtual model including a graphical representation of the ground-based route along the ground surface of the physical region, the current location, and the target location; and providing the virtual model to a rendering device via a network.

20. The one or more non transitory computer readable media of claim 19, wherein the virtual model comprises a mixed reality virtual model including a rendering of the object.

* * * * *